(12) United States Patent
Lu et al.

(10) Patent No.: US 8,067,878 B1
(45) Date of Patent: Nov. 29, 2011

(54) BLADELESS WIND POWER GENERATOR

(76) Inventors: Weixing Lu, Los Angeles, CA (US);
Allan Roberts, Buena Park, CA (US)

( * ) Notice: Subject to any disclaimer, the term of this patent is extended or adjusted under 35 U.S.C. 154(b) by 0 days.

(21) Appl. No.: 13/219,731

(22) Filed: Aug. 29, 2011

Related U.S. Application Data

(60) Provisional application No. 61/378,068, filed on Aug. 30, 2010.

(51) Int. Cl.
*H01L 41/08* (2006.01)
(52) U.S. Cl. .................................................. 310/339
(58) Field of Classification Search .................. 310/329, 310/339
See application file for complete search history.

(56) References Cited

U.S. PATENT DOCUMENTS

| | | | | |
|---|---|---|---|---|
| 2,509,913 | A * | 5/1950 | Espenschied | 290/4 D |
| 3,239,678 | A * | 3/1966 | Kolm et al. | 307/43 |
| 4,387,318 | A * | 6/1983 | Kolm et al. | 310/330 |
| 4,467,236 | A * | 8/1984 | Kolm et al. | 310/321 |
| 5,223,763 | A * | 6/1993 | Chang | 310/339 |
| 2009/0230916 | A1 * | 9/2009 | Fein et al. | 320/101 |

* cited by examiner

*Primary Examiner* — Mark Budd

(57) ABSTRACT

In a first embodiment, a wind to energy conversion system is constructed out of a number of modular power units (110), each modular power unit (110) comprised of 36 air jet tunnels (106). Each air jet tunnel (106) is constructed using a cantilever array mounted in a cascaded frame (104) with each cantilever (102) attached on one edge to a window edge of the frame (104). The cantilever (102) is constructed of a brass (130) layer sandwiched between two layers, each layer composed of an electrode (126) attached to a Poly Vinylidene Fluoride (PVDF) (128) layer. Each modular power unit (110) is mounted in a case (108), and a set of cases are mounted in a panel (114) attached to a pedestal (116). The cantilever arrays (117) are wired together into electrical regulating circuits that generate power with a high wind to power conversion efficiency. Other embodiments are presented.

20 Claims, 9 Drawing Sheets

136

BLADELESS WIND POWER GENERATOR

This application claims the benefit of the U.S. Provisional Patent Application No. 61/378,068 filed Aug. 30, 2010 by the present inventors. This provisional patent application is incorporated herein in its entirety by reference.

TECHNICAL FIELD

The present invention relates generally to generating electrical power from wind motion energy.

BACKGROUND OF THE DISCLOSURE

Current wind power generators generally employ wind turbines and electric motors to generate electricity. These systems are inefficient and expensive to construct and maintain. They are also noisy, intolerant to damage, and relatively difficult to transport and assemble[1,2]. They can also impose safety and environmental concerns. Unfortunately, a compact, modular, bladeless wind energy system does not exist although some approaches have been proposed. The potential advantages to its development include reduced noise, size, and cost combined with improved portability, efficiency, and cost-effectiveness.

The most common approaches to the design of a bladeless wind generator are based on electro-kinetic phenomena that involve the interaction between an electrostatic and a charged medium in a liquid phase. Electro-kinetic systems require designs that convert air movement to liquid movement and that separate and collect charge for electrical output. Air-liquid and liquid-solid interfaces have to be included in such system, resulting in very low conversion efficiency and high cost of manufacture. For example, Marks, "Charged aerosol generator with uni-electrode source" U.S. Pat. No. 2,406,396, 1977[3] proposed a vaneless ion wind generator that produces electrical energy directly by using the wind to pump charged aerosols (water droplets) from one electrode to another, with no moving parts. It is obvious that most of the wind's kinetic energy is lost in order to move the charged aerosol from one electrode to another. Daniel Y Kwok, et al, "Electrokinetic microchannel battery by means of electrokinetic and microfluidic phenomena", Journal of Micromechanics and Microengineering, 13, 964-970, 2003[4] proposed a microfluidic approach to extract energy from a pressure driven liquid flow in a microchannel.

However, this approach also exhibits low efficiency and high cost because it requires an additional energy-absorbing process to drive the liquid flow in the microchannels where only a weak electric current is induced due to the presence of an electrical double layer in the interface between the liquid and microchannel walls.

SUMMARY OF THE DISCLOSURE

The present invention is a new approach to converting wind motion to electrical power. The approach is based on an adaptation of the piezoelectric effect—a well known property of certain materials to produce electrical power when they undergo strain and stress. For example, in devices such as microphones, sound vibrations can create enough stress and strain on piezoelectric crystals to generate electric current. Based on recent breakthroughs in nanotechnology, new, low-cost, micro-sized crystals can now be assembled to create more efficient piezoelectric materials.

A first embodiment of this invention incorporates piezoelectric materials as components inserted into the side walls of a uniquely designed air jet tunnel to form a bladeless Wind Energy to Power (WEP) system. More specifically, the system uses (1) a thin brass layer, sandwiched between two Poly Vinylidene Fluoride (PVDF) layers to form a cantilever with high piezoelectric conversion; efficiency (2) a unique air jet tunnel and phononic cascade configuration with high coefficient of performance; and (3) a compact, modular power unit design.

The first embodiment of the present invention has the following advantages over the prior art:
  Bladeless: No rotating blades or mechanical moving parts are involved in the WEP system.
  Quiet Operation: The WEP system is very quiet because no mechanical moving parts are involved that are the main sources of sound vibration and the cantilever arrays are made of a piezoelectric polymer that does not generate a sound frequency perceptible by humans. The unique phononic structure design and sound shielding case will effectively prohibit sound propagation.
  Modular: The WEP system is assembled with a basic repeatable and modular small units that serves as building blocks to be integrated into any size or shape to provide a wind power generator.
  High Efficiency: The unique WEP design including its cascading phononic array and air jet tunnel configuration, the PVDF-brass-PVDF sandwich cantilevers, the high surface area ratio of cantilevers to inside walls, the specific ratio of air intake window to air outlet window, and the aspect ratio (the average cross section to the length of air jet tunnel) to ensure that the WEP system will have a very high energy conversion efficiency.
  Low Cost: Unlike the current wind turbine generators or electro-kinetics based approaches, WEP technology will not require expensive equipments and micro structure fabrication processes. WEP technology is low in maintenance, highly durable and very cost effective.
  Robust and Light Weight: All the materials used are light and strong, such as the air jet tunnel, the frame and case materials.

These advantages are made possible by the following unique innovations:
  Application of small air jet tunnels with side cantilever arrays;
  Incorporation of a PVDF-brass-PVDF sandwich piezoelectric cantilevers as kinetic-electric conversion devices;
  Integration of a cascading phononic structure specifically designed and constructed for an air jet tunnel and sandwich cantilever array.
  Market Potential: The present invention represents a major advance in the conversion of wind energy to electric power and will lead to more efficient, less costly wind generators. These generators will provide benefits in a wide variety of applications because, compared to existing wind turbine systems, they can be less noisy, more efficient, less costly and more adaptable. The systems may well represent the future of wind energy converters since they may be able to lower the cost of wind power to a level more competitive with fossil fuels. As such they will compete in the fast growing worldwide market for wind power generators where they are expected to have many advantages over current systems, including higher electrical conversion efficiency, lower cost of manufacture, lower maintenance cost due to the lack of mechanical moving parts, longer life, and greater adaptability due to the modular design. These advantages open up the possibility for these systems to make renewable, non-polluting wind power more competitive with fossil fuels in the electric power markets worldwide. As such, this new technology would have enormous positive social, environmental and energy impact.

Wind power currently produces about 1.5% of world-wide electricity, and has become one of the leading electricity-producing power sources in various countries. In 2008 the worldwide newly installed capacity of wind power was 27,000 megawatts (MW),[8] an increase of 29% compared to 2007. The total generated capacity worldwide at the end of 2008 was 121,188 MW, generating 260 terawatt hours (TWh). The World Wind Energy Association (WWEA) expects the installed capacity to keep increasing at a very fast rate, and to be around 190.000 MW in 2010 and 1.5 million MW in 2020 equaling around 12% of global electricity consumption.[9] According to Clean Edge, capital costs of new installations are projected to expand from $51.4 billion in 2008 to $139.1 billion in 2018.[8] This is expected to be the case even with the current financial crisis, as wind power is attractive to investors due to its relatively low-risk character, it's societal and economic benefits, and the growing need for clean and reliable energy sources. In 2008, Europe accounted for 32.8% of the worlds wind market, North America for 32.6%, and Asia for 31.5%. Latin America's share was 0.6% and Africa's share 0.5%.[9] Since the WEP technology is expected to have the advantage of low-cost, high efficiency, and modularity compared to competitor wind turbine systems, it can potentially make strong inroads into this wind energy market.

LIST OF PART NUMBERS

102—cantilever
104—frame
106—air jet tunnel
108—case
110—modular power unit
112—air outlet window
114—panel
116—pedestal
117—cantilever array
118—phononic array
119—module tunnel grouping
120—side wall
122—air intake opening
124—air outtake end
125—air intake flow
126—electrode
127—longitudinal axis
128—piezoelectric material
129—angle-of-attack
130—metal layer
131—exit air flow
132—front grid
133—air outtake flow
134—back grid
136—tunnel circuitry
137—first cantilever edge
138—first window edge
140—module circuitry
142—panel circuitry

BRIEF DESCRIPTION OF THE DRAWINGS

FIGS. 4B and 4C illustrates alternate configurations of the air jet tunnel.

DETAILED DESCRIPTION

The term cascaded frame, in this detailed description, means that the frame has cross-sections that decrease in size moving from the air intake opening 122 to the air outtake end 124. The term air flow energy is interpreted as wind energy. If a part number in the figures refers to multiple parts, only one or two parts may be assigned the part number, and the same part number may be used for the singular part and the same multiple parts in the figures. The same part number may be used for a generic term such as the piezoelectric material 128 and a specific implementation such as polyvinylidene fluoride (PVDF).

Figure 1A:
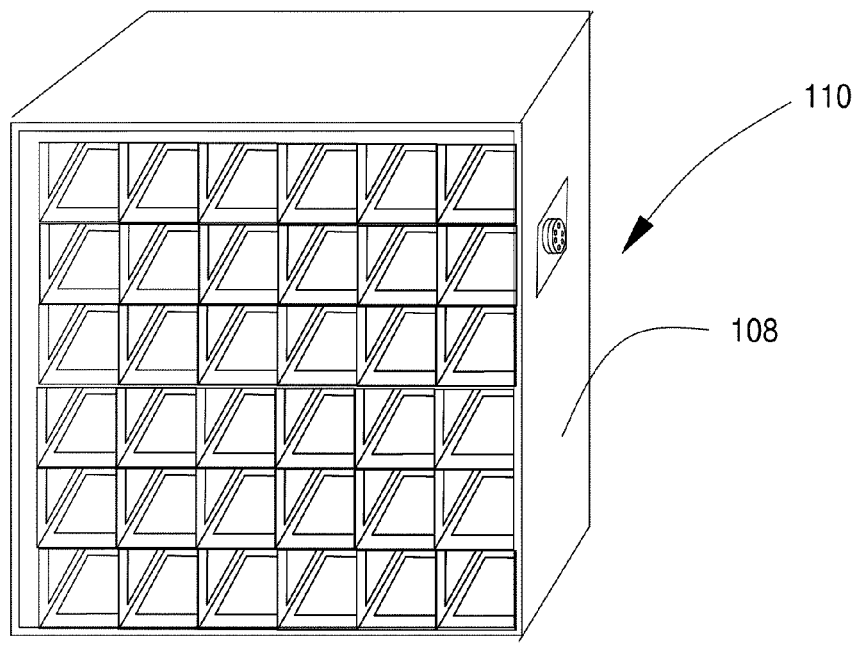
FIGS. 1A and 1B illustrate front and back perspective views of a modular power unit of the first embodiment of the present invention.
Figure 1B:
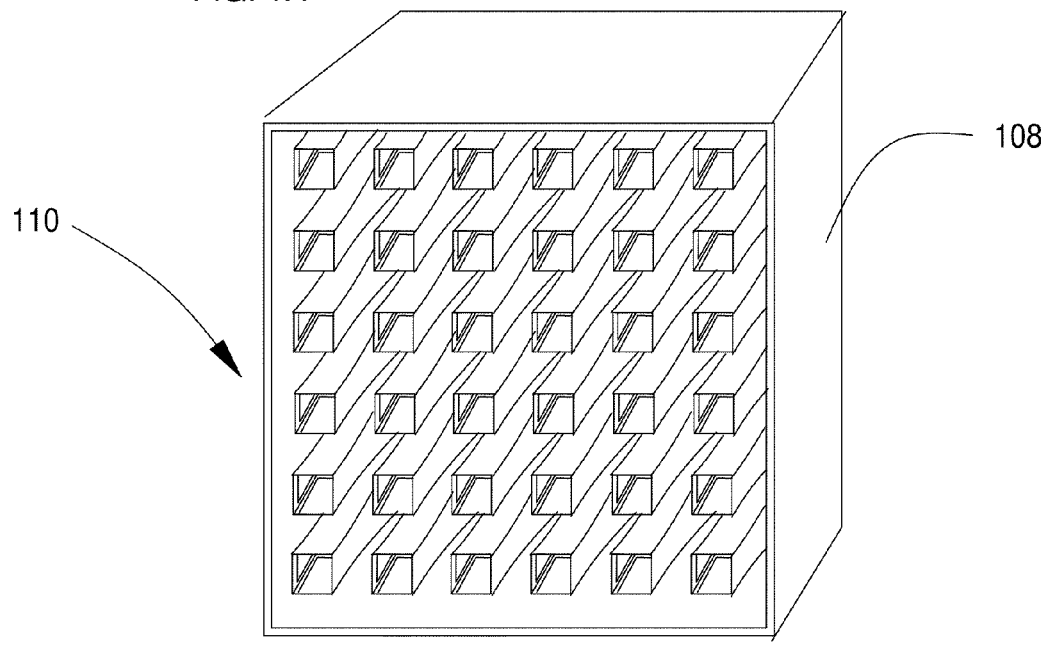
Figure 1C:
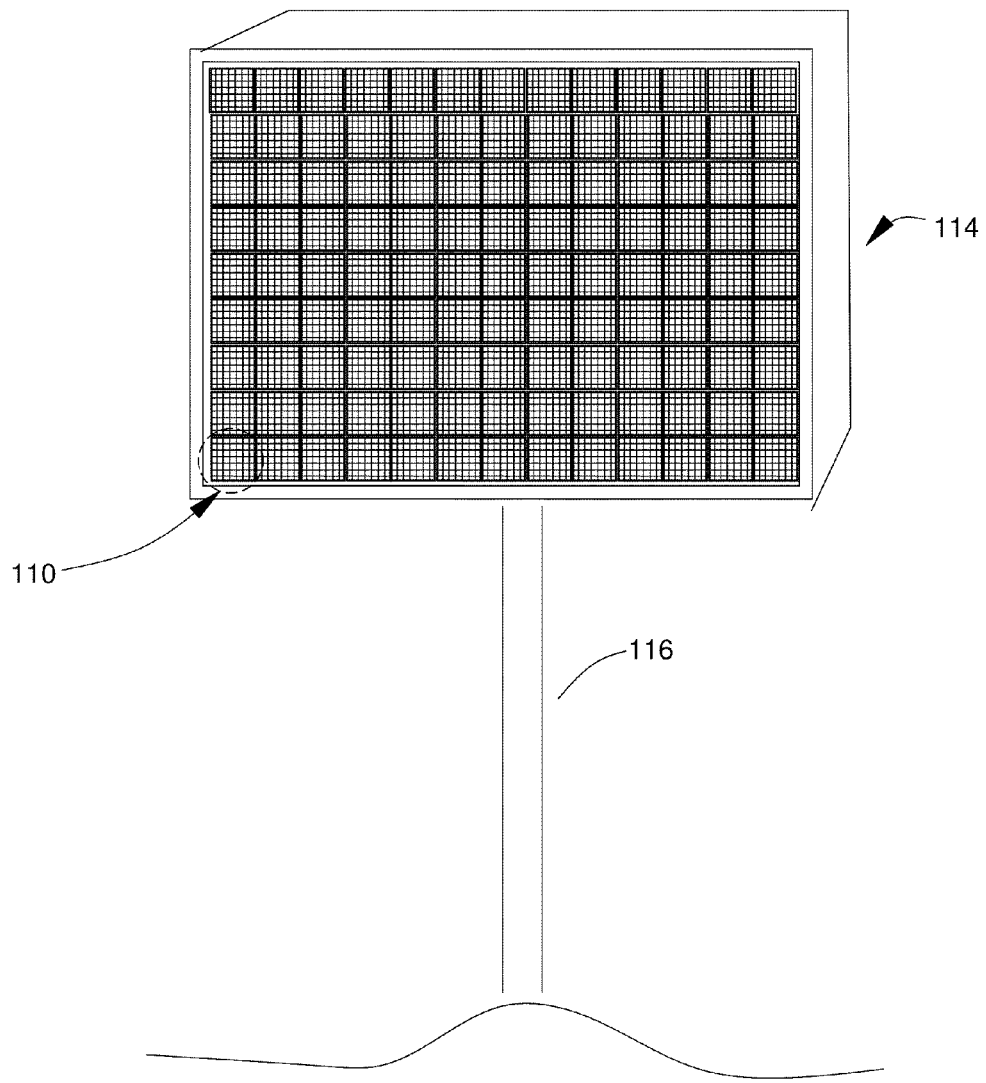
FIG. 1C illustrates a perspective view of the first embodiment of the present invention.
Figure 1D:
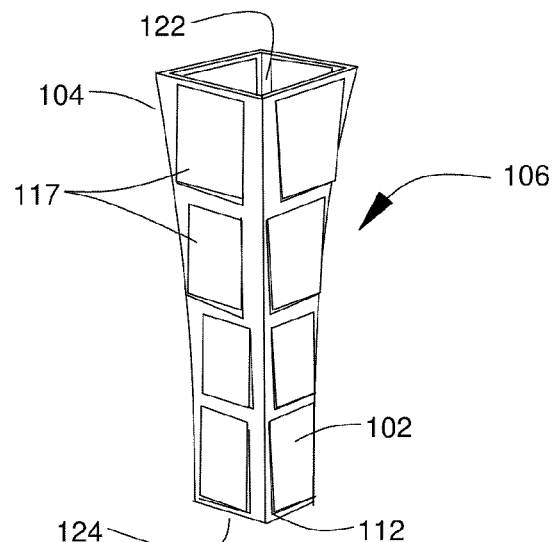
FIG. 1D illustrates a perspective view of an air jet tunnel of the first embodiment of the present invention.
Figure 1E:
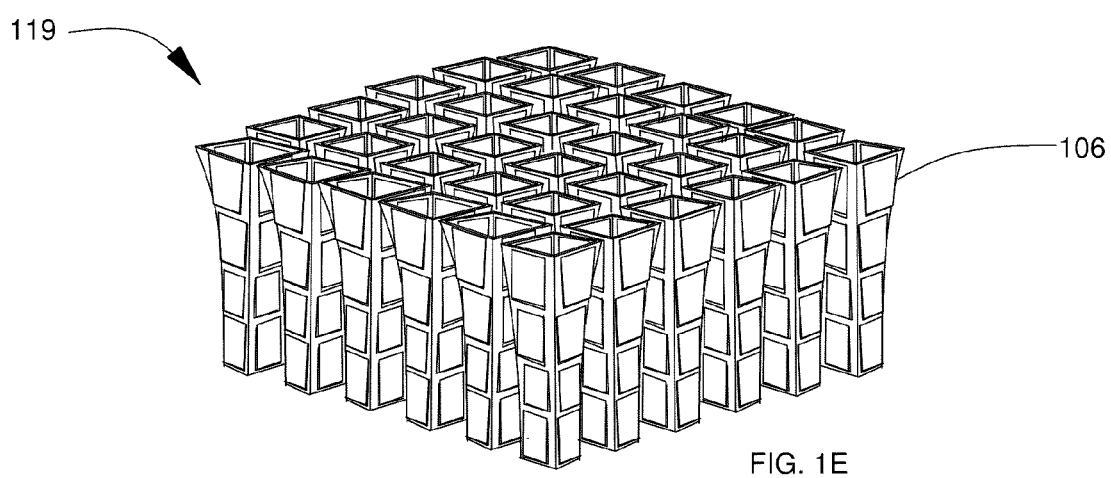
FIG. 1E illustrates a perspective view of a set of air jet tunnels used in a modular power unit of the first embodiment of the present invention.
Figure 2A:
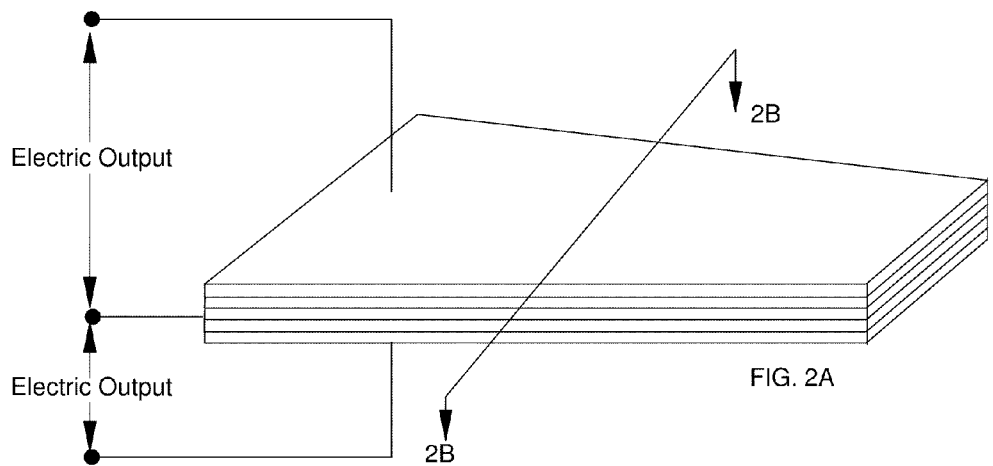
FIG. 2A illustrates a perspective view of a cantilever of the first embodiment of the present invention.
Figure 2B:
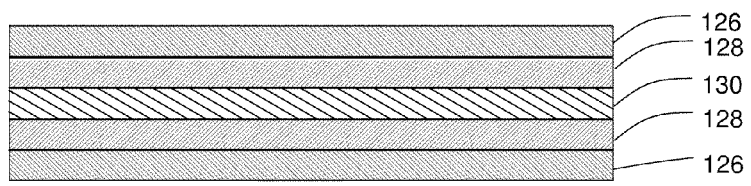
FIG. 2B illustrates a cross section of the cantilever of FIG. 2A.
Figure 3A:
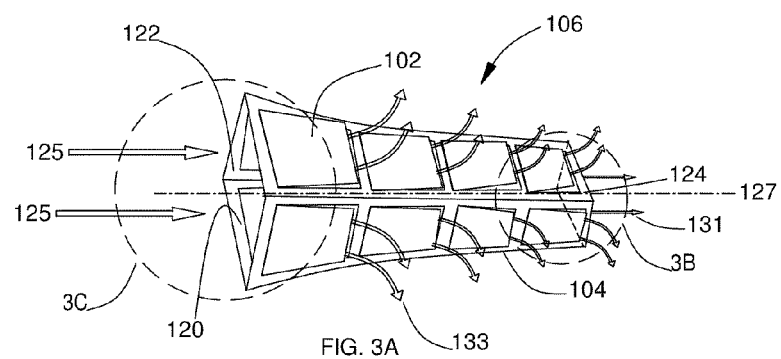
FIG. 3A illustrates a perspective view of an air jet tunnel of the first embodiment of the present invention.
Figure 3B:
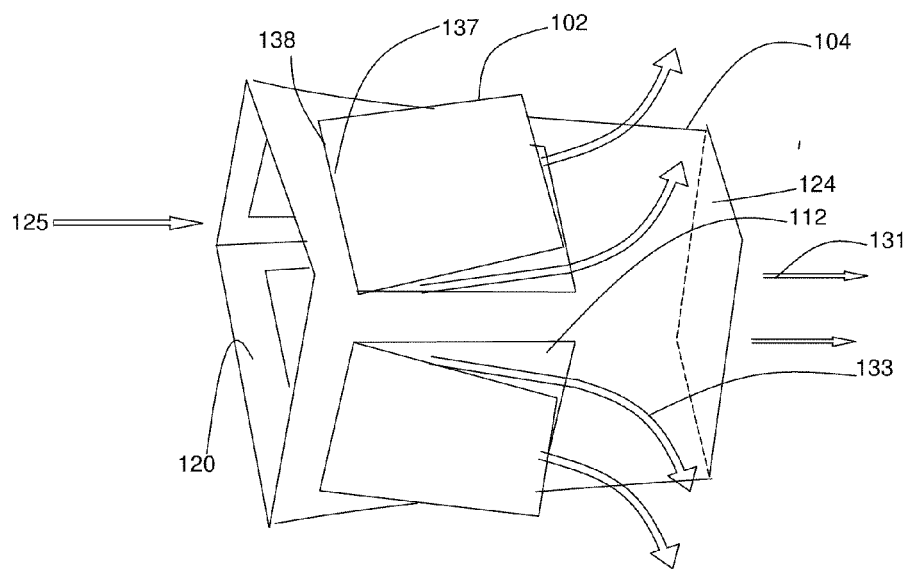
FIG. 3B illustrates a perspective view of a detail of FIG. 3A.
Figure 3C:
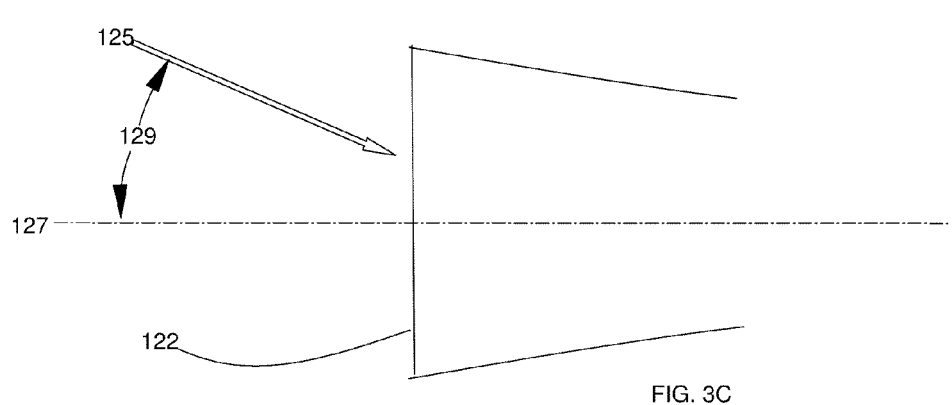
FIG. 3C illustrates the definition of an angle-of-attack.

FIGS. 1A through 1E illustrates an overview and the use of the air jet tunnels of a first embodiment of the present invention. FIGS. 2A and 2B illustrate a proprietary design of a cantilever 102 used in the embodiment. FIG. 3A illustrates the configuration of the air jet tunnel 106 with cascading cantilever array 117 on the side walls 120 showing the path of air flow through the air jet tunnel 106. FIG. 3B, a detail of FIG. 3A in expanded scale illustrates two cantilevers 102 and the air flow around them. FIG. 3C, a second detail of FIG. 3A in expanded scale, illustrates the angle-of-attack 129 between the air intake flow 125 and the air jet tunnel 106 for the first embodiment. Referring to FIGS. 1A through 3B, the first embodiment is comprised of a group of trapezoidal shaped cantilevers 102 (see FIGS. 2A and 2B) with the cantilevers 102 mounted in a cascaded frame 104 that forms an air jet tunnel 106 (see FIG. 1D). In other embodiments, the cantilevers 102 can have the shape of an approximate trapezoid (i.e. a trapezoid with curved sides, or more generally an approximate polygon. In the first embodiment, the air jet tunnel's 106 air intake opening 122 is positioned at the air intake flow 125. The frame 104 has a plurality of air outlet windows 112 that permit the air flow to exit (air outtake flow 133) the air outlet windows 112, and optionally to exit the air outtake end 124 (exit air flow 131). Each cantilever 102 is firmly mounted on the cascaded frame 104 of the air jet tunnel 106 at the larger parallel edge (first cantilever edge 137) of the trapezoidal shaped cantilever 102.

Figure 6:
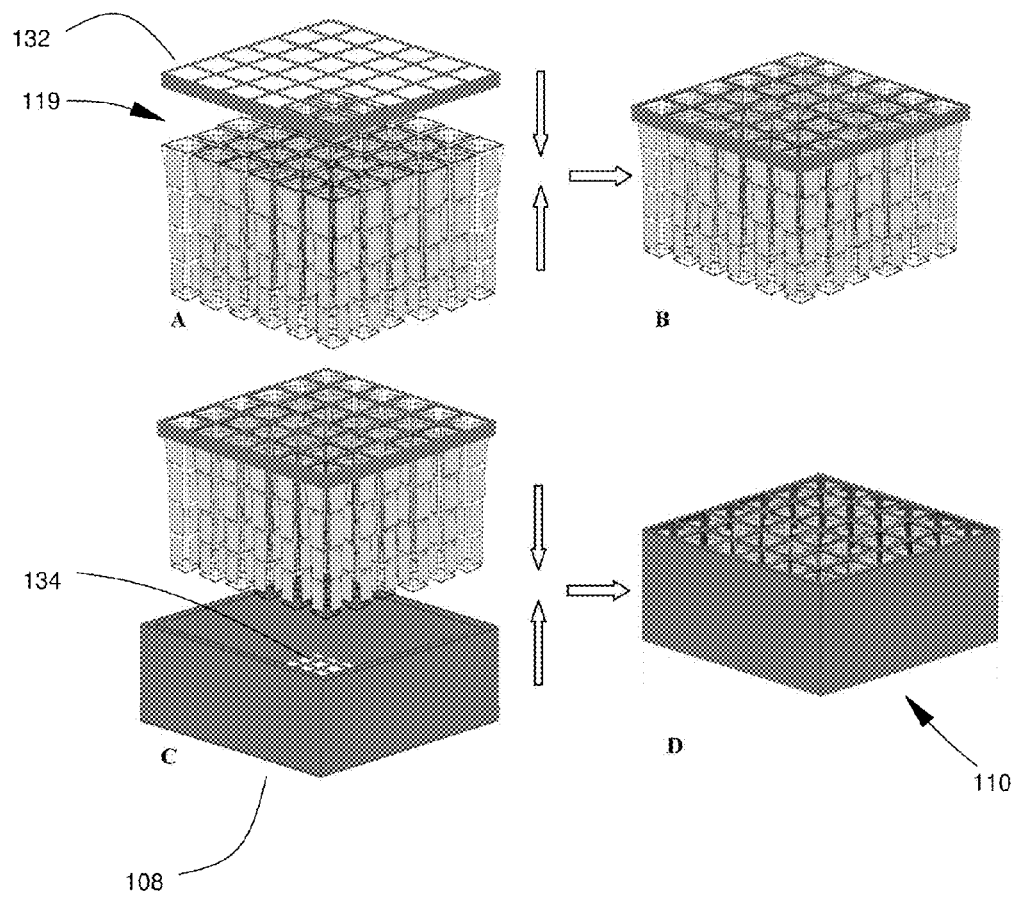
FIG. 6 illustrates an assembly flow diagram for constructing a modular power unit of the first embodiment of the present invention.

A number of air jet tunnels 106 (see FIG. 1E) are mounted in a case 108 to form a modular power unit 110. The case 108 has a front grid 132 and a back grid 134 (See FIG. 1E for the mounted unit without the case 108.) FIG. 1A illustrates a front view of a modular power unit 110 mounted in a case 108; FIG. 1B illustrates a rear view of modular power unit 110 mounted in a case 108; and FIG. 6 illustrates the front grid 132 and the back grid 134. Note that FIG. 1A shows 36 air jet tunnel air intakes openings 122 in a front view of modular power unit 110. FIG. 1B shows 36 air jet tunnel outtake ends 124, each surrounded by rectangular spaces where air flows out from the many air outlet windows 112. FIG. 1C shows the modular power units 110 attached together to form a large panel 114 that is mounted on a pedestal 116 and positioned on a hill to generate energy from wind. The system in FIG. 1C may also have a motor and other mechanisms to rotate the panel into the wind. In other embodiments, any number of air jet tunnels 106 can be contained in each modular power unit 110 and any number of modular power units 110 can be contained in a panel 114 comprising the wind energy conversion system. In alternate embodiments, the front grid 132 and back grid 134 may be designed with various patterns of openings, and the grids may be designed to be positioned either on the outside or the inside the case to hold the air jet tunnels 106 fixed so as to keep effective air flowing inside and outside the air jet tunnels 106.

Again referring to FIGS. 1A through 1E, 2A and 2B, the modular power units 110 of the first embodiment can be assembled to form a large panel with a low volume, small ground contact footprint and low weight capable of delivering large amounts of power with a range of wind resources. The Wind Energy to Power (WEP) system operates with minimum noise. The modular power units 110 can be assembled into various shapes such as rectangular or approximately circular or oval to form a large panel 114 that is adaptable to the physical site conditions and power demands. The WEP system is highly durable, requires little maintenance, and is easy to transport and assemble.

Figures 4A, 4B, 4C:
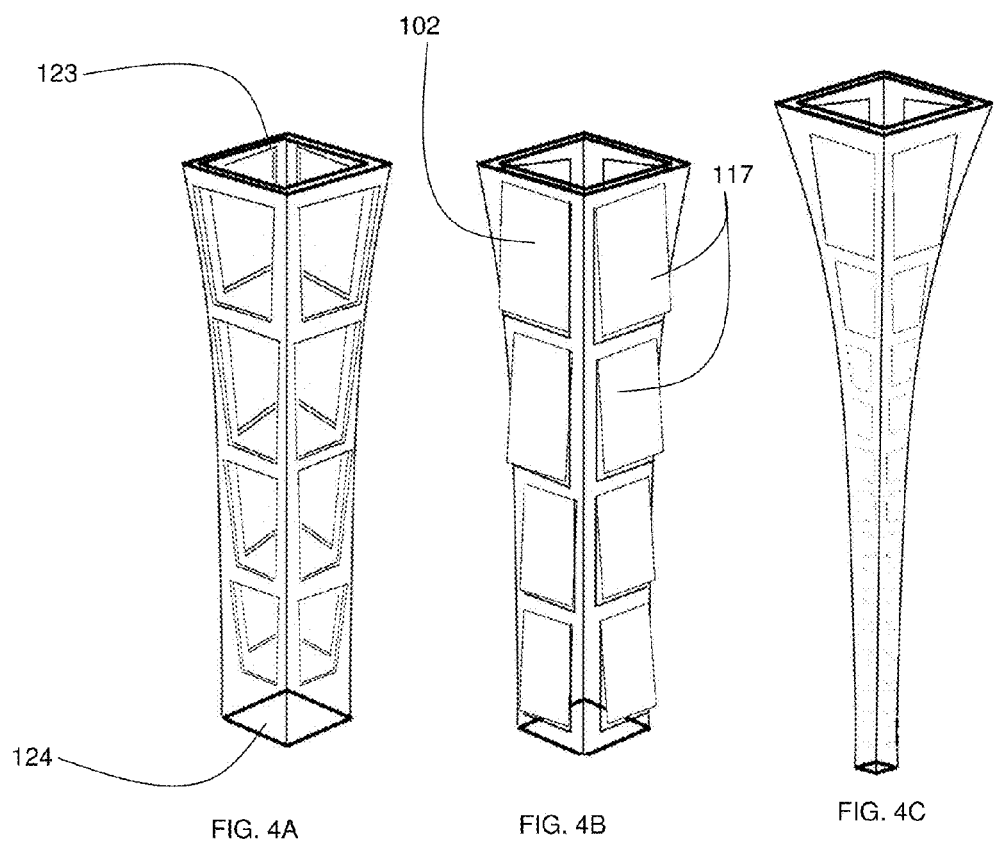
FIGS. 4A through 4C illustrate an air jet tunnel without cantilevers.

Referring to FIGS. 1A through 1E, 2A and 2B, and 3A, the modular power unit 110 of the first embodiment is comprised of a number of identical air jet tunnels 106 (see FIG. 1E) that form a cascade type module tunnel grouping 119. The shape of the cross section of each air jet tunnel 106 in the first embodiment is rectangular. In alternate embodiments, the air jet tunnel 106 can take on various 3-dimensional shapes such as rectangle, trapezoid, pyramid, cylinder, etc. or contain curved surfaces with different cascaded shapes, a few possibilities are shown in FIGS. 4A through 4C. Furthermore, in alternate embodiments, the air jet tunnel 106 can be designed with virtually any size and shape in order to optimize performance efficiency for various applications and environmental conditions.

The actual dimensions and configuration of the modular power unit 110 is determined to optimize the aerodynamic performance and for obtaining a large internal surface to volume ratio. The side walls 120 of the air jet tunnel 106 have many air outlet windows 112 that are filled with corresponding cantilevers 102 (see FIG. 3A), such that the kinetic energy of the moving air will be largely absorbed and converted to the electrical power by the piezoelectric cantilever structures. In the first embodiment, the cantilevers 102 are each structured as an electrode-PVDF-brass-PVDF electrode (electrode 126, PVDF 128, brass 130) sandwich as shown in FIGS. 2A and 2B. When the cantilever is comprised of multiple layers, the positive and negative surfaces of the piezoelectric materials used in each layer may be aligned in series, parallel, or a combination thereof depending on the application. Referring now to FIGS. 3A and 3B, the area ratio of cantilevers 102 to the side walls 120 of the air jet tunnel 106 is larger than 90% to ensure high conversion efficiency. The ratio of the air outtake end 124 to the air outlet windows 112 is larger than two to maintain the effects of lateral forces generated by the air flow and exert required pressures on the cantilevers 102. The aspect ratio (the average cross section to the length of air jet tunnel 106) also may be optimized in terms of maximum sandwich cantilever area, maximum conversion efficiency, and maximum coefficient of performance. In alternate embodiments, the cantilever 102 can be made using virtually any type of existing piezoelectric material (polymers such as polyvinylidene fluoride (PVDF), ceramics such as Lead zirconate titanate (PZT), crystals such as quartz, etc.). The cantilever 102 can also contain one or more layers of brass or other metals bonded to the piezoelectric material 128. In addition, the piezoelectric material for a cantilever 102 of higher efficiency can be fabricated by using standard nano-technology thin film fabrication processes, such as coating, etching, deposition, and Langmuir-Blodgett processes, to form a non-central symmetric thin-film of piezoelectric particles on a metal or other type of substrate surface.

The electrode-PVDF-brass-PVDF-electrode cantilevers 102 of the first embodiment will vibrate and generate AC output power when the air flows through the air jet tunnel 106. PVDF is a piezoelectric polymer that has high piezoelectric stress constants ($g_{31}$~240 mV-m/N)[5] indicating it has excellent kinetic-to-electric conversion properties. The sandwich design not only improves the conversion efficiency but also prevents noise generation because PVDF is a soft polymer that is able to effectively absorb acoustic vibration energy. These cantilevers 102 inside the modular power unit 110 are assembled in a periodic manner that generates a phononic array 118 structure with a bandgap frequency within the human perception range. However, the sound is absorbed by the materials employed resulting in nearly silent operations. The modular power unit 110 is integrated into a protection case 108 that will further eliminate any residual sound. The cantilevers 102 can be connected to one another via a combination of series and parallel wiring into tunnel circuitry 136, module circuitry 140 and panel circuitry 142 (circuitry not shown in the figures) to effectively tune the output voltage and current exiting the panel. The specific circuitry in general depends on the application, and designing appropriate circuits for e various alternate embodiments is straightforward by experts in the field.

The materials used in the first embodiment are light and robust, such as the air jet tunnel 106, cascaded frame 104 and case 108 materials made of polymers in the first embodiment. The entire weight of a modular power unit 110 is less than 400 g (4.11 oz) making the larger assembled panel <300 kg (661.4 pounds) and able to deliver >3 k W of power with a wind resource of 10 meters per second (32.8 feet/second). The modular power units 110, each with a volume of 0.2×0.2×0.1 cubic meters, can be readily assembled in a building block manner to form virtually any shape and size. A large flat panel with a volume of less than 2.8 cubic meters (3.66 cubic yards) and a ground contact footprint of less than 1 square meter (1.20 square yards) would be able to deliver >3 k W of power with a wind resource of 10 meters per second (32.8 feet/second. The WEP system is modular, durable, and very easy to transport and assemble. The technology associated with the WEP has significant military and commercial applications. The approach makes harvesting large quantities of wind energy feasible by avoiding the high cost, intolerance to damage, low efficiency, environmental and safety drawbacks of current wind turbines. WEP is a potentially disruptive breakthrough technology that is highly scalable and could therefore provide both large and small amounts of power in many types of wind energy applications, wherever a continuous wing energy source exists such as for shipboard and airborne electronics, as well as in various residential and commercial systems. Scaled up to their maximum potential, WEP systems could potentially reduce the cost of wind power substantially, allowing it to become an even more viable source of clean, renewable energy for the national power grid.

Piezoelectric Cantilever: The use of piezoelectric materials yields significant advantages for energy harvesting systems. The energy density achievable with piezoelectric devices is potentially greater than that possible with electro-kinetic, electrostatic or electromagnetic devices. Since piezoelectric materials convert mechanical energy into electrical energy via stress and strain in the piezoelectric material, they lend themselves to devices that operate by bending or flexing, which brings significant design advantages.

TABLE 1

Property comparison of standard piezoelectric polymer and ceramic

| Piezoelectric Materials | $d_{31}$[a] (pm/V) | $g_{31}$[a] (mV – m/N) | $k_{31}$ | Salient Feature |
|---|---|---|---|---|
| Polyvinylidenefluoride (PVDF) | 28 | 240 | 0.12 | Flexible, lightweight, low acoustic and mechanical impedance |
| Lead Zirconium Titanate (PZT) | 175 | 11 | 0.34 | Brittle, heavy, toxic |

[a]Values shown are absolute values of constants.

Piezoelectricity is a property of many non-central symmetric ceramics, polymers, and other biological systems. The properties of organic polymers such as PVDF are so different in comparison to inorganic ceramic materials such as PZT (see Table 1) that they are uniquely qualified to fill niche areas where single crystals and ceramics are incapable of performing as effectively. As noted in Table 1, the piezoelectric strain constant ($d_{31}$) for the PVDF polymer is lower than that of the ceramic. However, piezoelectric polymers have much higher piezoelectric stress constants ($g_{31}$) indicating that they are much better kinetic-to-electric converters than ceramics. In addition to their high strength and high impact resistance[5], piezoelectric polymeric materials also offer the advantage of processing flexibility because they are lightweight, tough, readily manufactured into large areas, and can be cut and formed into complex shapes. Other notable features of polymers are low dielectric constant, low elastic stiffness, and low density, which result in high voltage sensitivity (excellent sensor characteristic), and low acoustic and mechanical impedance (crucial for medical and underwater applications). Polymers also typically possess a high dielectric breakdown and high operating field strength, which means that they can withstand much higher driving fields than ceramics. Polymers offer the ability to pattern electrodes on the film surface, and pole only selected regions. Based on these features, piezoelectric polymers possess their own established area for technical applications and useful device configurations. The first embodiment of the present invention uses the piezoelectric polymer PVDF as the building block materials for the kinetic-to-power conversion application; however, other embodiments using piezoelectric materials including but not limited to ceramic, quartz can be used in various applications of the technology.

The most commonly used geometrical configuration in piezoelectric power harvesting is the rectangular cantilever beam. The cantilever beam harvester has been well researched and has proven to be easy to implement and effective for harvesting energy from ambient vibrations. The first embodiment uses different sizes of trapezoidal shaped cantilevers 102 (FIG. 2A) for different applications so that the strain can be more evenly distributed throughout the structure leading to more than twice the energy generation than a rectangular beam. Other embodiments may use uses different sizes and shaped cantilevers such as rectangles, triangles, etc.

FIG. 2B illustrates the electrode-PVDF-brass-PVDF-electrode piezoelectric cantilever structure. When the cantilever bends during the vibration generated by air flow, it will effectively produce a strain and corresponding stress on the PDVF layers that in turn will effectively convert the energy of the strain to electric current. A cantilever 102 has a unique resonant frequency. By properly selecting the length, thickness, shape, elasticity and mass of the beam, the overall device is designed to have a wide band of resonant frequencies to achieve a maximum kinetic-to-electric conversion efficiency $C_E$ and $C_E > 50\%$.

State of the art Air Jet Tunnel Design and Fabrication: In order to effectively convert the kinetic wind energy to mechanical movement of the electrode-PVDF-brass-PVDF-electrode cantilevers 102 for electric power generation, the first embodiment of the present invention includes an air jet tunnel 106 for optimal aerodynamic performance that can effectively generate air flow turbulence and convert the air flow to pressure on the side walls 120 of the air jet tunnel. FIGS. 3A and 3B illustrate the configuration of the air jet tunnel 106 and the path of the air intake flow 125 through the air jet tunnel 106. The side walls of the air jet tunnel 106 have many trapezoidal shaped air outlet windows 112 that are covered with corresponding piezoelectric PVDF-brass-PVDF sandwich cantilevers. As the turbulent air intake flow moves through the outlet windows, it creates stresses and strains on the corresponding piezoelectric cantilevers that effectively absorb and convert the kinetic energy of the moving air to electrical power. The first cantilever edge 137 is mechanically fixed on the corresponding trapezoidal shaped first window edge 138 and the other sides of the cantilever 102 are left free.

FIGS. 3A through 3C shows the angle between the air intake flow 125 entering the air intake opening 122 and the longitudinal axis 127 of the air jet tunnel 106 for the first embodiment. The air intake flow 125 passes through the air outlet window 112 as air outtake flow 133. The angle-of-attack 129 between the air intake opening 122 and longitudinal axis 127 of the air jet tunnel 106 can vary significantly with optimal angles being between −20 and +20 degrees. In the first embodiment, as indicated in FIGS. 3A and 3B, the first window edge 138 and the first cantilever edge 137 are joined and positioned towards the air intake opening 122. In alternate embodiments (not shown in the figures), the first window edge 138 and the first cantilever edge 137 are joined and positioned towards the air outtake end 124. In various embodiments, the air outtake end 124 may be open, closed or throttled so that the air outtake flow 133 may be controlled.

Due to the flow shape of each air jet tunnel 106 and the optimal ratio of the air intake opening 122 to the air outlet windows 112, the airflow pressure on the side walls is uniformly dispersed on the cantilevers 102 resulting in cantilever vibration. The area ratio of side window cantilevers 102 to the inside surface walls of the tunnel is larger than 90% to ensure high conversion efficiency of the overall device. The aspect ratio (the ratio of the average cross section area to the length of air jet tunnel—$A=S_{avg}/L$) is optimized in terms of maximum cantilever area, maximum conversion efficiency, and maximum coefficient of performance.

The configuration of each tunnel can be adjusted to achieve optimal aerodynamic performance for specific applications. The ratio of the air intake opening area to the air outlet windows area $\alpha=S_{in}/S_{out}$ is larger than two to maintain the effects of lateral forces generated by the air flow and to exert the required pressures on the cantilevers. The ratio A and ratio α affect the coefficient of performance C. By selecting the proper ratios for A and α, a high coefficient of performance (>0.50) can be obtained.

FIG. 4A illustrates a cascaded frame of a quadrilateral air jet tunnel 106 (A=2 and α=1.5) with four trapezoidal shaped open side windows on each wall. It does not include the cantilevers 102. FIG. 4B illustrates its complete structure with trapezoidal electrode-PVDF-brass-PVDF-electrode cantilevers. FIG. 4C illustrates an air jet tunnel 106 with A=9 and α=5 respectively, and with 13 trapezoidal side windows and electrode-PVDF-brass-PVDF-electrode cantilevers 102 on each side wall 120.

Figure 5A:
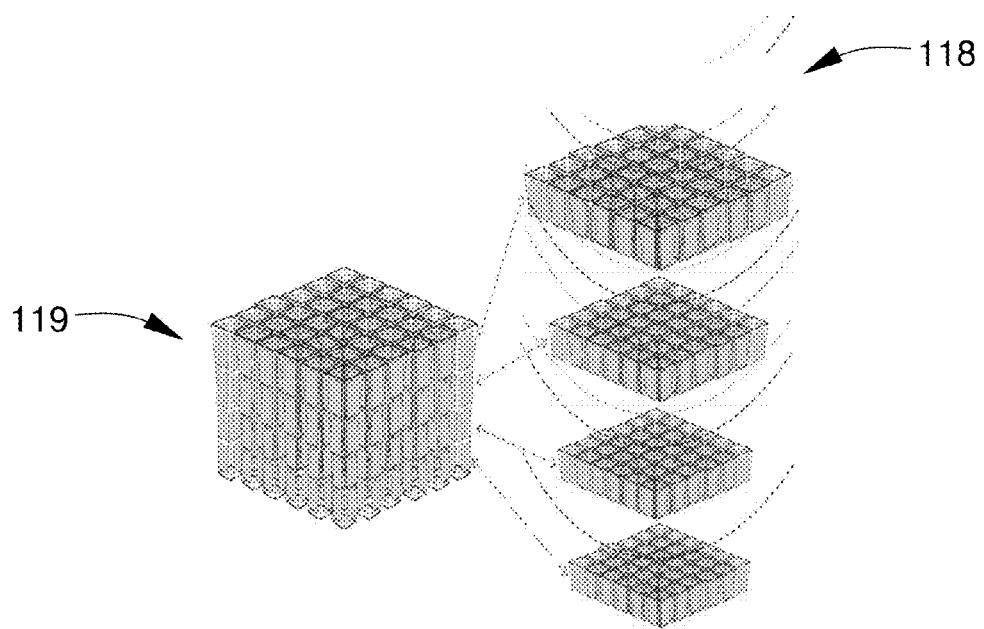
FIG. 5A illustrates multiband acoustic energy waves emanating from the air jet tunnels of a modular power unit of the first embodiment of the present invention.

Air Jet Tunnel Array and Cascade Phononic Structure: The air jet tunnels 106 are assembled to form a two dimensional (2D) array for extracting a large amount of wind energy as illustrated in the left figure of FIG. 5A. This array forms not only a modular panel but also a cascading phononic lattice structure. Due to the cone-like structure of the air jet tunnels, the cantilevers at different levels create different 2D phononic crystal effects due to the different periodic lengths as illustrated in the four layers of the right side of FIG. 5A. The combination of these four 2D phononic crystal lattice patterns creates a cascading phononic structure capable of absorbing the multiband acoustic energy waves and prohibiting their propagation through the structure.

Referring again to FIG. 5A, 2D phononic crystal lattice can be made by creating an array of air-filled cylinders in a solid material (see insert) so that the speed of sound varies periodically. The dispersion relations—plots of frequency, ω, versus wave vector, k—for different phonons in this structure (dashed lines) reveal that wave propagation is not supported for certain ranges of frequencies (yellow region). This is a phononic band gap. In a homogeneous material, $\omega=c\cdot k$, where c is the velocity of sound, and the dispersion relation would appear as a straight line on this graph. The directions with the highest symmetry in this structure are Γ-X and Γ-M (see insert)[6].

Figure 5B:
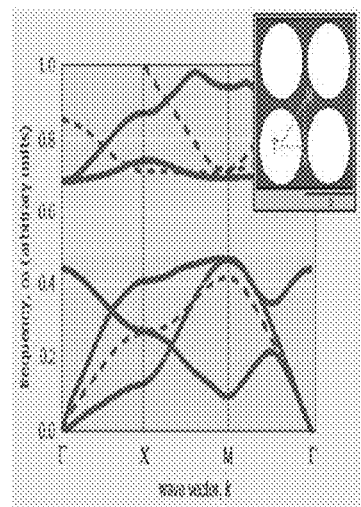
FIG. 5B illustrates a typical 2-dimensional phononic crystal lattice acoustic dispersion pattern.

Phononic lattice structure crystals make use of the fundamental properties of waves, such as scattering and interference, to create "band gaps"—ranges of wavelength or frequency within which waves cannot propagate through the structure. The bandgap in a phononic lattice crystal is created by a periodic variation in the refractive index of an artificially structured material. In a phononic crystal lattice, the density and/or elastic constants of the structure change periodically. This changes the speed of sound inside the structure, which, in turn, leads to the formation of a phononic band gap. FIG. 5B shows a typical 2-dimensional phononic crystal lattice acoustic dispersion pattern and its relations with the band gap.

The existence of a phononic bandgap in the band structure implies the availability of flat regions in the propagation modes immediately below and above the gap itself, in which the wave group velocity goes to zero. In these regions, the vibration kinetic energy localizes in the form of an oscillatory motion of the internal structural elements (the vibration of the cantilevers), rather than being transferred across the material's propagating waves. In other words, the substructures behave as wave dampers and dynamic energy absorbers. The idea is to exploit the piezoelectric effect featured by the electrode-PVDF-brass-PVDF-electrode cantilevers 102 and convert its vibration energy into electrical power localized in the resonators at frequencies of excitation falling near the bandgaps. The cascading phononic filtering effect can not only dramatically improve the kinetic-to-electric power efficiency but also make the overall system nearly silent.

The band gap density and its resulting filtering effect are dramatically enhanced through the introduction of the cascading array structure which resonates at specific frequencies and produces significant strain and energy localization. The enhancement of energy harvesting is achieved as a result of the conversion of the localized kinetic energy into electrical energy through the electrode-PVDF-brass-PVDF-electrode cantilevers 102 sitting in the lattice framework.

Modular and Quiet Wind Generator Unit: The WEP system, as illustrated in FIG. 6, is constructed with an array of air jet tunnels 106, a circuit board and an electric coupler to smooth or regulate output power, a power panel generator receiving quantities of power from the modular power units 110, front and back grids and protection case that will also absorb acoustic waves to further eliminate system sounds. FIG. 6 illustrates an assembly flow diagram of the modular power unit 110. FIG. 6 does not show the module circuitry 140 of the modular power unit 110.

Necessary Electronic Circuits: The plurality of layers within the cantilever 102 can be interconnected to one another via a combination of series and parallel circuitry to effectively capture the piezoelectric output voltage and current generated by each layer. The power directly from the cantilevers 102 is non-regular AC power that needs to be regulated to either DC current or to a required voltage and frequency via the appropriate transformers, rectifiers, and control circuits. The cantilevers 102 comprising the cantilever array 117 are interconnected via additional series and parallel circuitry. The circuitry which is standard in the field may be implemented in various ways in alternate embodiments to match the electrical output to the application requirements.

Figure 7A:
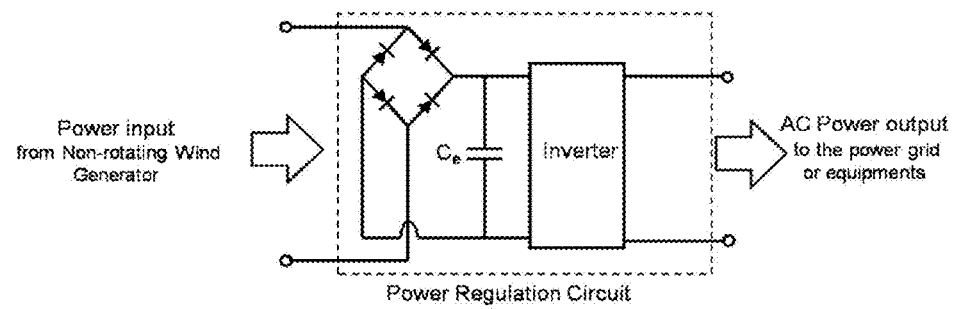
FIG. 7A illustrates a power regulation circuit of the first embodiment of the present invention.
Figure 7B:
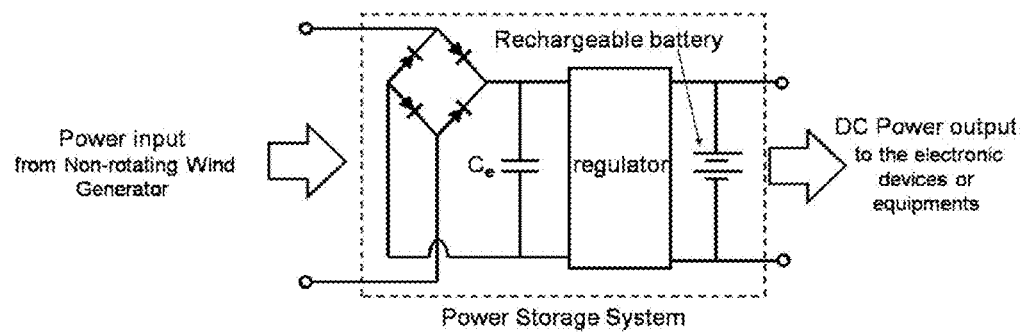
FIG. 7B illustrates a power storage system of the first embodiment of the present invention.

FIGS. 7A and 7B show two examples of the basic circuit diagram with necessary electronic components for the first embodiment. The circuit board is designed as part of the first embodiment of the present invention, while the electronic components and rechargeable battery are commercially available. AC power from the cantilevers 102 is input to a circuit board to regulate and smooth the output DC voltage and current for a rechargeable battery (FIG. 7A). For some applications, the current will be converted to a required AC power by a static inverter that has no moving parts and is used in a wide range of applications, from small switching power supplies in computers, to large electric utility high-voltage direct current applications that transport bulk power (FIG. 7B).

More generally, each cantilever 102 has its own independent electrical circuit that connects its generated AC electrical output to a bridge rectifier before connecting it to the other cantilevers in the system. In various alternate embodiments, the bridge rectifier can be a full wave rectifier, half wave rectifier, single phase rectifier, or multi-phase rectifier. These all work, but the efficiency and cost will vary. In the first embodiment, the rectified electrical output of all the cantilevers in the system is combined together in a series circuit. In alternate embodiments, the rectified electrical output of the cantilevers is combined together in a series circuit, parallel circuit or combination thereof depending on the application. Alternate embodiments can also include electrical circuits with capacitors, charge pumps, rechargeable batteries, regulators and other electrical components depending on the application.

Efficiency Evaluation of the WEP System: Betz' law and coefficient of performance: Wind energy comes from mass flow that obeys conservation of mass and the laws of aerodynamics. The efficiency of extracting wind energy by any wind generator with cross section S will be constrained within these natural laws. The more kinetic energy a wind generator pulls out of the wind, the more the wind will be slowed down as it leaves the generator. If we tried to extract all the energy from the wind, the air would move away at speed zero, i.e. the air could not leave the generator. In that case we would not extract any energy at all, since all the air would be prevented from entering the generator. Therefore, it is obvious that no wind generator can achieve 100% efficiency. A German Physicist, Albert Betz, identified the so-called Betz law that states that a maximum of $^{16}/_{27}$ (or 0.59) of the kinetic energy of wind can be converted to mechanical energy[7]. This efficiency is called the Coefficient of Performance and denoted as $C_{p,max}$. All wind generators use a two step process to convert wind kinetic energy preferred to mechanical energy then from mechanical to electrical energy. Therefore, according to Betz law, the overall Coefficient of Performance will always be less than 0.59.

Efficiency and corresponding size of WEP system: Because air has mass and it moves to form wind, it has kinetic energy as follow:

Kinetic energy (joules)=½×m×$V^2$ where: m=mass (kg); V=velocity (meters/second). Usually, were more interested in power than energy. Since energy=power×time, and density is a more convenient way to express the mass of flowing air, the kinetic energy equation can be converted into a flow equation:

Power in the area of a wind generator panel $P=0.5\times D_A \times A \times V^3$ where P=power in watts; $D_A$=air density (about 1.225 kg/m$^3$ 400 g at sea level, less higher up); A=area of wind generator panel exposed to the wind (m$^2$); V=wind speed in meters/sec.

This equation yields the power in a free flowing stream of wind. Of course, it is impossible to extract all the power from the wind because some flow must be maintained through the panel. Therefore, some additional terms need to be included to get a practical equation for the wind generator panel. Wind panel Power:

$P=0.5\times D_A \times A \times Cp \times V^3 \times C_E$ where: P=power in watts; $D_A$=air density (about 1.225 kg/m$^3$ at sea level, less higher up); A=panel area, exposed to the wind (m$^2$); Cp=Coefficient of performance (0.59 {Betz limit} is the maximum theoretically possible, 0.5 for a good design of air jet tunnel); V=wind speed in meters/sec; $C_E$=Conversion efficiency of the cantilever array panel (the estimated value of WEP is 50%). With a good design, this equation can be expressed as:

$P/A=0.5\times 1.225\times 0.5\times V^3 \times C_E$

If we want a 3 kW generator with a wind resource of 10 meters per second (32.81 feet/second) and 50% efficiency ($C_E$), the panel area "A" should be 3000/153=19.6 m$^2$ that will require a volume of 2 cubic meters (2.616 cubic yards) because the thickness of the WEP panel is only 10 cm (3.84 inches).

Other embodiments are consistent with the inventive concept presented herein. These include multilayered cantilever structures as well as employment of materials in the cantilevers different from brass and PVDF. For example, the cantilever structure could be comprised of multiple electrode/PVDF layers followed by a brass layer followed by multiple PDVF/electrode layers. In addition, any elastic metal or combination of elastic metals could be substituted for the brass layer and any piezoelectric thin film, including piezoelectric polymer, piezoelectric ceramic, piezoelectric crystal, and so on, could be substituted for the PVDF layers.

In the first embodiment, each cantilever 102 contains a brass layer sandwiched between two piezoelectric layers with electrode coatings. However, other embodiments may employ cantilevers 102 with piezoelectric material and electrodes on only one side of a brass layer or no brass layer at all. Furthermore, different embodiments could include cantilevers of virtually any shape provided one side or section of the cantilever 102 is fixed to the air jet tunnel frame 104 window edge. The trapezoid shape is used in the first embodiment to follow the contours of the air jet tunnel and increase the surface area and efficiency of the cantilevers 102 without reducing the structural integrity of the air jet tunnel cascaded frame 104. However, cantilevers 102 can take any shape. The cantilevers can also be single layer or multilayer, with electrodes in between layers.

Still other embodiments can include air jet tunnels of many sizes and configurations and they can be made from many materials including metals, plastics, wood, carbon fiber, acrylic and others. The first embodiment incorporates certain air jet dimensional ratios to improve aerodynamic performance and increase electrical conversion efficiency. However, other embodiments with different dimensions and ratios can be constructed to produce electrical power under various wind conditions.

REFERENCES

REF. 1: Scott Lux and Roch Ducey, Non-rotating Wind Energy Generation, Army SBIR 2010.2—Topic A10-111, 2010.

REF. 2: Office of the Director of Defense Research and Engineering, "The Effect of Windmill Farms On Military Readiness—2006," REPORT TO THE CONGRESSIONAL DEFENSE COMMITTEES.

REF. 3: Marks, A. "Wind Power Charged Aerosol Generator," Final Report Subcontract XH-9-S128-1, Solar Energy Research Institute (SERI) of DOE, 1980. Marks, A, "Charged aerosol generator with uni-electrode source" U.S. Pat. No. 2,406,396, 1977.

REF. 4: Daniel Y Kwok, et al, "Electrokinetic microchannel battery by means of electrokinetic and meicrofluidic phenomena", *Journal of Micromechanics and Microengineering*, 13, 964-970, 2003.

REF. 5: G. T. Davis, "Piezoelectric and Pyroelectric Polymers", Polymers for Electronic and Photonic Applications, C. P. Wong, ed., Academic Press, Inc.: Boston, Mass., p. 435, 1993.

REF. 6: T. Gorishnyy, M. Maldovan, C. Ullal and E. Thomas, "Sound Ideas", Physics World, pp. 24-29, December, 2005.

REF. 7: Albert Betz, Introduction to the Theory of Flow Machines. (D. G. Randall, Trans.) Oxford: Pergamon Press, 1966.

REF. 8: Clean Edge—Makower, J., Pernick, R., Wilder, C., Clean Energy Trends 2009.

REF. 9: WWEA, World Wide Energy Report 2008, www.wwindea.org.

We claim:

1. An air flow energy to power conversion system comprised of:
    a plurality of cantilevers 102, each cantilever 102 being comprised of electrodes 126 and at least one piezoelectric material 128, each cantilever 102 having a first cantilever edge 137;
    an air jet tunnel 106 having a frame 104, the frame 104 having an air intake opening 122, and a plurality of air outlet windows 112, each of the air outlet windows 112 having a first window edge 138 wherein each of the air outlet windows 112 is sized and configured to receive one of the cantilevers 102, the first cantilever edge of each cantilever 102 being attached to the first window edge 138 of one of the air outlet windows 112;
    the air jet tunnel 106 configured so that when an air intake flow 125 flows in the direction towards the air intake opening 122, a portion of the air intake flow 125 then passes through the plurality of air outlet windows 112 creating air outtake flows 133, the air outtake flows 133 causing stress and strain in each of the cantilevers 102 thereby generating power in each of the cantilever 102.

2. An air flow energy to power conversion system comprised of:
    a plurality of cantilevers 102, each cantilever 102 being comprised of electrodes 126 and at least one piezoelectric material 128, each cantilever 102 having a first cantilever edge 137;
    an air jet tunnel 106 having a frame 104, the frame 104 having an air intake opening 122, an air outtake end 124 and a plurality of air outlet windows 112, the air outlet windows 112 each having a first window edge 138 wherein each of the air outlet windows 112 is sized and configured to receive one of the cantilevers 102, the first cantilever edge of each cantilever 102 being attached to the first window edge 138 of one of the air outlet windows 112;
    the air jet tunnel 106 configured so that when an air intake flow 125 flows in the direction towards the air intake opening 122, a portion of the air intake flow 125 then passes through the plurality of air outlet windows 112 creating air outtake flows 133, and optionally a portion of the air intake flow 125 pass through the air outtake end 124 as exit air flow 131, the air outtake flows 133 thereby causing stress and strain in the cantilevers 102 covering the windows 112;
    tunnel circuitry 136 attached to each cantilever 102 that collects from each cantilever 102 electrical power generated due to stress and strain of the piezoelectric materials.

3. The air flow energy to power conversion system of claim 2 wherein each of the cantilevers 102 is further comprised of one layer of an electrode 126 followed by at least one layer of piezoelectric material 128 followed by a metal layer 130 followed by at least one layer of piezoelectric material 128 followed by a layer of electrode 126.

4. The air flow energy to power conversion system of claim 2 wherein the frame 104 has a cascaded shape with the air intake opening 122 being larger than the air outtake end 124 and the first cantilever edge 137 of a plurality of the cantilevers 102 being positioned towards the air intake opening 122.

5. The air flow energy to power conversion system of claim 2 wherein the frame 104 has a cascaded shape with the air intake opening 122 being larger than the air outtake end 124 and the first cantilever edge 137 of a plurality of the cantilevers 102 being positioned towards the air outtake end 124.

6. The air flow energy to power conversion system of claim 2 wherein the air jet tunnel 106 is designed so that a ratio of the area of the air intake opening 122 to the area of the air outtake end 124 is larger than 2.

7. The air flow energy to power conversion system of claim 2 wherein the air outtake end 124 of the air jet tunnel 106 is throttled to adjust the quantity of air allowed to pass through.

8. The air flow energy to power conversion system of claim 2 wherein the air intake flow 125 is wind.

9. The air flow energy to power conversion system of claim 2 wherein the frame 104 has a cross section selected from the group consisting of an approximate polygon, a circle and an ellipse.

10. The air flow energy to power conversion system of claim 2 wherein a plurality of the cantilevers 102 and the air outlet windows 112 have a shape selected from the group consisting of an approximate polygon, a circle, and an ellipse.

11. The air flow energy to power conversion system of claim 2 wherein the piezoelectric material 128 is selected from the group consisting of polymers, ceramics, crystals, polyvinylidene fluoride, lead zirconate titanate, and quartz.

12. The air flow energy to power conversion system of claim 2 wherein a plurality of layers of piezoelectric material 128 and electrodes 126 is used to form each cantilever 102 wherein the positive and negative surfaces of the piezoelectric materials 128 are aligned in series, parallel or a combination thereof within the cantilever 102.

13. The air flow energy to power conversion system of claim 2 wherein the tunnel circuitry 136 collects electrical power in an additive manner.

14. The air flow energy to power conversion system of claim 2 where the piezoelectric material is fabricated by using a thin film fabrication processes to form at least one layer of non-central symmetric thin-film of piezoelectric particles on a solid substrate surface to form the piezoelectric material.

15. The air flow energy to power conversion system of claim 14 wherein the thin film fabrication processes is a Langmuir-Blodgett process.

16. The air flow energy to power conversion system of claim 2 further comprising a modular power unit 110, the modular power unit 110 comprised of a plurality of air jet tunnels 106 configured such that the plurality of air jet tunnels 106 generates a phononic array 118 whereby the air intake flow travels through each of the air outlet windows 112, and the air outtake flows 133 induce and intensify a vibration of the cantilevers 102 which generate the electrical power that is passed by the tunnel circuitry 136 to a module circuitry 140.

17. The air flow energy to power conversion system of claim 16 wherein the modular power unit 110 further comprises
    a case 108;
    a front grid 132 and a back grid 134, the front grid 132 and the back grid 134 positioned to hold the air jet tunnels 106 fixed while allowing free flow of air inside and outside the air jet tunnels 106; and
    the tunnel circuitry 136 and the module circuitry 140 together employing a plurality of electronic components wired such that the electrical power generated by the cantilevers 102 are additive when collected via the module circuitry 140.

18. The air flow energy to power conversion system of claim 2 wherein the tunnel circuitry 136 is selected from the group consisting of bridge rectifiers, rechargeable batteries, voltage controllers, capacitors, charge pumps and any combinations thereof.

19. The air flow energy to power conversion system of claim 17 further comprising a plurality of the modular power units 110 mounted in a panel 114 wherein the air intake flow 125 generates a quantity of power at each of the modular power units 110, the quantities of power transmitted through the module circuitry 140, the panel 114 and panel circuitry 142 thereby forming a power panel generator.

20. The air flow energy to power conversion system of claim 19 where the panel 114 is rotatable into the wind.

* * * * *